(12) United States Patent
Clerc

(10) Patent No.: US 12,373,814 B2
(45) Date of Patent: Jul. 29, 2025

(54) ITEM OF FINE JEWELRY HAVING PAYMENT MEANS

(71) Applicant: VALEUR DECLAREE, Paris (FR)

(72) Inventor: Fanny Clerc, Paris (FR)

(73) Assignee: Valeur Declaree, Paris (FR)

( * ) Notice: Subject to any disclaimer, the term of this patent is extended or adjusted under 35 U.S.C. 154(b) by 0 days.

(21) Appl. No.: 18/863,053

(22) PCT Filed: May 4, 2023

(86) PCT No.: PCT/EP2023/061840
§ 371 (c)(1),
(2) Date: Nov. 5, 2024

(87) PCT Pub. No.: WO2023/213964
PCT Pub. Date: Nov. 9, 2023

(65) Prior Publication Data
US 2025/0131406 A1  Apr. 24, 2025

(30) Foreign Application Priority Data
May 6, 2022 (FR) .................................. FR2204334

(51) Int. Cl.
*A44C 15/00* (2006.01)
*G06Q 20/32* (2012.01)
(52) U.S. Cl.
CPC ............ *G06Q 20/321* (2020.05); *A44C 15/00* (2013.01)
(58) Field of Classification Search
CPC ......... A44C 15/00; A44C 5/0007; A44C 5/00; A44C 5/0015; A44C 5/0084;
(Continued)

(56) References Cited

U.S. PATENT DOCUMENTS 9,824,310 B2 * 11/2017 Huynh ................. A44C 17/005
10,509,994 B1 * 12/2019 Huynh ............. G06K 19/07762
(Continued)

FOREIGN PATENT DOCUMENTS

CN      205696124      11/2016
CN      205913018       2/2017
(Continued)

OTHER PUBLICATIONS

International Patent Application No. PCT/EP2023/061840 filed May 4, 2023; International Search Report / Written Opinion issued Jul. 3, 2023; 13 pages, English language translation included.

*Primary Examiner* — Jack W Lavinder
(74) *Attorney, Agent, or Firm* — Mueting Raasch Group

(57) ABSTRACT

The invention relates to an item of jewellery (1), in particular a ring, bracelet or pendant, comprising: a body (2) having an inner surface (3), an outer surface (4) and an opening (5) passing through the body (2) from the inner surface (3) to the outer surface (4), the body (2) being made of a material selected from gold, silver, platinum, titanium, palladium, steel or vermeil; an outer shell (10) forming part of the outer surface of the item of jewellery (1) and being in contact with the body (2), the outer shell (10) being made of a material selected from precious gems, fine gems, ornamental gems or leather; an inner shell (11) forming part of the inner surface (3) and being in contact with the body (2), a closed housing (12) being formed between the outer shell (10) and the inner shell (11) substantially in line with, or in, the opening (5), the housing (12) being semi-circular, the inner shell (11) being made of a material selected from precious gems, fine gems, ornamental gems or leather; a flexible tag (13) arranged in the housing (12) and comprising an electronic chip (14) and an antenna (15) arranged around the electronic chip (14);

(Continued)

and a screw (20) holding the outer shell (10) and the inner shell (11) together.

14 Claims, 15 Drawing Sheets

(58) Field of Classification Search
CPC ....... A44C 5/0092; A44C 9/00; A44C 9/0053; A44C 25/00; A44C 25/001; G06Q 20/321; G06K 19/07762
See application file for complete search history.

(56) References Cited

U.S. PATENT DOCUMENTS

| | | | |
|---|---|---|---|
| 10,855,335 B1* | 12/2020 | Napoles | H01Q 5/40 |
| 2014/0260424 A1 | 9/2014 | Warren | |
| 2019/0006742 A1* | 1/2019 | McLear | H05K 1/028 |
| 2021/0344105 A1* | 11/2021 | Jung | H01Q 7/04 |
| 2023/0292889 A1* | 9/2023 | Schiffer | G06K 19/07762 |
| 2023/0394273 A1* | 12/2023 | Giudici | G06K 7/10168 |

FOREIGN PATENT DOCUMENTS

| | | |
|---|---|---|
| CN | 106562524 A | 4/2017 |
| CN | 107752245 | 3/2018 |
| CN | 208339068 | 1/2019 |
| CN | 210276170 | 4/2020 |
| GB | 2559621 A | 8/2018 |
| KR | 100847764 | 7/2008 |
| KR | 100857280 | 9/2008 |
| WO | WO 2022084886 A1 | 4/2022 |

\* cited by examiner

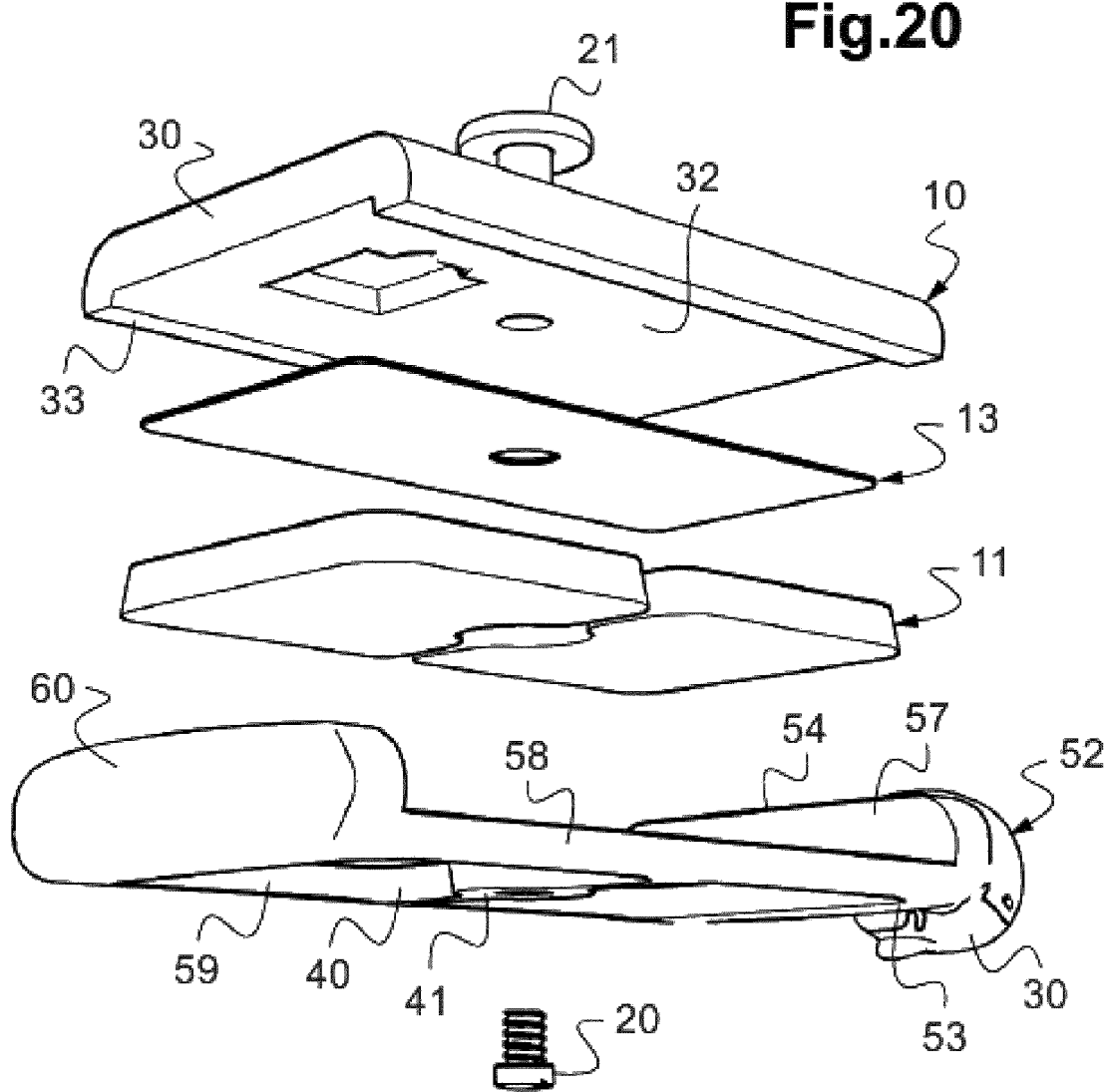

ITEM OF FINE JEWELRY HAVING PAYMENT MEANS

This application is the § 371 U.S. National Stage Application of International Application No. PCT/EP2023/061840, filed May 4, 2023, which was published on Nov. 9, 2023, as International Publication No. WO 2023/213964 A1. International Application No. PCT/EP2023/061840 claims priority French Patent Application No. FR2204334, filed May 6, 2022.

The invention relates to the field of jewelry, in particular bracelets and rings and pendants.

The Applicant has observed deep evolutions in the field of fine jewelry regarding materials and shapes. Nonetheless, a constant fact is that the fine item of jewelry is non-functional meaning that it does not have any technical function for the wearer of said item of jewelry. An item of jewelry may be provided with mechanisms such as a clasp intended to set in place or hold the item of jewelry. These are functions that are secondary to the ornamental function.

US 111083256 provides a ring whose inner surface is recessed in cross-section to form an annular channel. An NFC transponder comprising an antenna in the form of a coil etched on a cylindrical shaped flexible substrate is installed in the annular channel. A resin seal encapsulates the NFC transponder and the flexible substrate. Yet, a ring model is manufactured in several sizes for different finger diameters. Each size corresponds to particular resin seal, NFC transponder and flexible substrate. This substantially complicates manufacture. In addition, the signal emitted by the antenna arranged in the annular channel inside the ring is poorly transmitted. This imposes constraints on the selection of the material making up the ring, the shape of the ring and its dimensions because of the dimension of the NFC transponder and of the substrate. The antenna of the NFC transponder turns around the ring. Yet, the selection of the material, of the shape and of the dimensions is of great importance for an item of jewelry and pertains to the artistic creation. Hence, imposing such constraints is a major drawback.

The Applicant has designed and developed an item of jewelry provided with a payment means independent of the size of the jewel and complying with the freedom of ornamental design of the item of jewelry while offering a quality transmission.

The invention provides an item of jewelry, in particular a ring or bracelet or pendant, comprising a body having an inner surface, an outer surface and an opening passing through the body from the inner surface to the outer surface, the body being made of a material selected from among: gold, silver, platinum, titanium, palladium, steel or vermeil; an outer shell forming part of the outer surface of the item of jewelry and in contact with the body, the outer shell being made of a material selected from among: precious gems, fine gems, ornamental gems, leather; an inner shell forming part of the inner surface and in contact with the body, a closed housing being formed between the outer shell and the inner shell substantially in line with or in the opening, the housing being semi-circular, the inner shell being made of a material selected from among: precious gems, fine gems, ornamental gems, leather; a flexible tag arranged in the housing and comprising an electronic chip and an antenna arranged around the electronic chip, and a screw holding the outer shell and the inner shell together. The body can be made in a wide range of materials, in particular precious metals. The dimensions of the tag are maintained from one size of a jewelry model to another, and for several jewelry models. The tag is hidden within the item of jewelry and thus allows for an absence of visual and aesthetic impact.

In one embodiment, two openings are formed throughout the body from the inner surface to the outer surface, the two openings being separated by a crosspiece forming part of the ring body. The transmission of the signal is preserved and mounting is facilitated.

In one embodiment, the screw is engaged in the crosspiece. Mounting is simple and robust.

In one embodiment, the screw is engaged in the body in the vicinity of an edge of the opening, an additional screw being engaged in the body in the vicinity of an edge of the opening on the opposite side. The opening may have a large size.

In one embodiment, the screw cooperates with a threaded bore formed in the body or with a nut. Mounting is robust.

In one embodiment, the body is made in one-piece. The mechanical strength is satisfactory.

In one embodiment, the outer shell has a thickness comprised between 1.0 and 3.0 mm.

In one embodiment, the inner shell has a thickness comprised between 1.0 and 2.0 mm. This results in a great ornamental freedom.

In one embodiment, said precious, fine or ornamental gem is selected from among:

Diamond, Rubis, Sapphire,

Beryl, in particular emerald, aquamarine, heliodor, morganite,

Tourmaline, in particular verdelite, rubellite, Paraiba tourmaline, indicolite, schorl, Topaz, in particular sky-blue topaz, Swiss-blue topaz, London-blue topaz, Garnet, in particular demantoid garnet, almandine garnet, tsavorite garnet, spessartite garnet, hessonite garnet, rhodolite garnet, pyrope garnet, Quartz, in particular cat-eye quartz, falcon-eye quartz, tiger-eye quartz, bull-eye quartz, aventurine, amethyst, citrine, prasiolite, pink quartz, blue quartz, red quartz, smoky quartz, Chalcedony in particular agate, chrysoprase, Carnelian, onyx, sardis stone, pietersite, Jasper, in particular red jasper, blood jasper, heliotropic jasper, Feldspars, in particular amazonite, moon stone, labradorite, sunstone, Opal, in particular fire opal, cacholong, noble opal, Jade in particular jade, jadeite, nephrite jade, charoite, Peridot, tanzanite, iolite, zircon, cyanite, spinel, rock crystal, kunzite, sodalite, azurite, turquoise, rhodonite, rhodochrosite, malachite, chrysocolla, sugilite, chrysoberyl, andalusite, diopside, pinolite, lapis lazuli, Nacre, coral, amber, silicified wood.

In one embodiment, the electronic chip forms a protuberance with respect to the antenna and the outer shell has a local concavity corresponding to said protuberance. The bulk is optimized.

In one embodiment, the body has a plane of symmetry passing through the axis of said ring and has over its outer surface an indentation adapted to the outer shell. The outer surface of the part is substantially smooth.

In one embodiment, the body is a ring body.

In one embodiment, the tag is removable.

In one embodiment, the tag is hidden by the rest of the jewel.

Other features and advantages of the invention will appear upon examining the following detailed description.

FIG. 20 is an exploded front view of the item of jewelry of FIG. 15.

In the field of jewelry, compliance with the artistic freedom of the creator of the object is fundamental. Conventionally, the artistic freedom has been tempered by the mechanical limits of the materials implemented. The search for the audacity of the shapes has led to the development of stronger materials. Simultaneously, the implementation of original materials, often fragile, has also been desired.

Then, the miniaturisation of communication electronics has made it possible to consider incorporation thereof into item an of jewelry. Nonetheless, the requirements of data throughput and transmission quality are high, all the more so as a high-quality item of jewelry cannot contend with a low-end transmission. Having taken account of the analysis that it had thus made, The Applicant has developed an item of jewelry suitable for high-performance radiocommunication electronics. The Applicant has identified several difficulties. The metal making up most of the volume of an item of jewelry generally forms a poor radio wave transmitter, and even forms a shield considerably attenuating the waves.

Moreover, an item of jewelry sometimes comprises other non-metallic materials. The Applicant has sought to take advantage of said non-metallic materials to favour the transmission of radio waves despite the use of precious metals.

Figure 3:
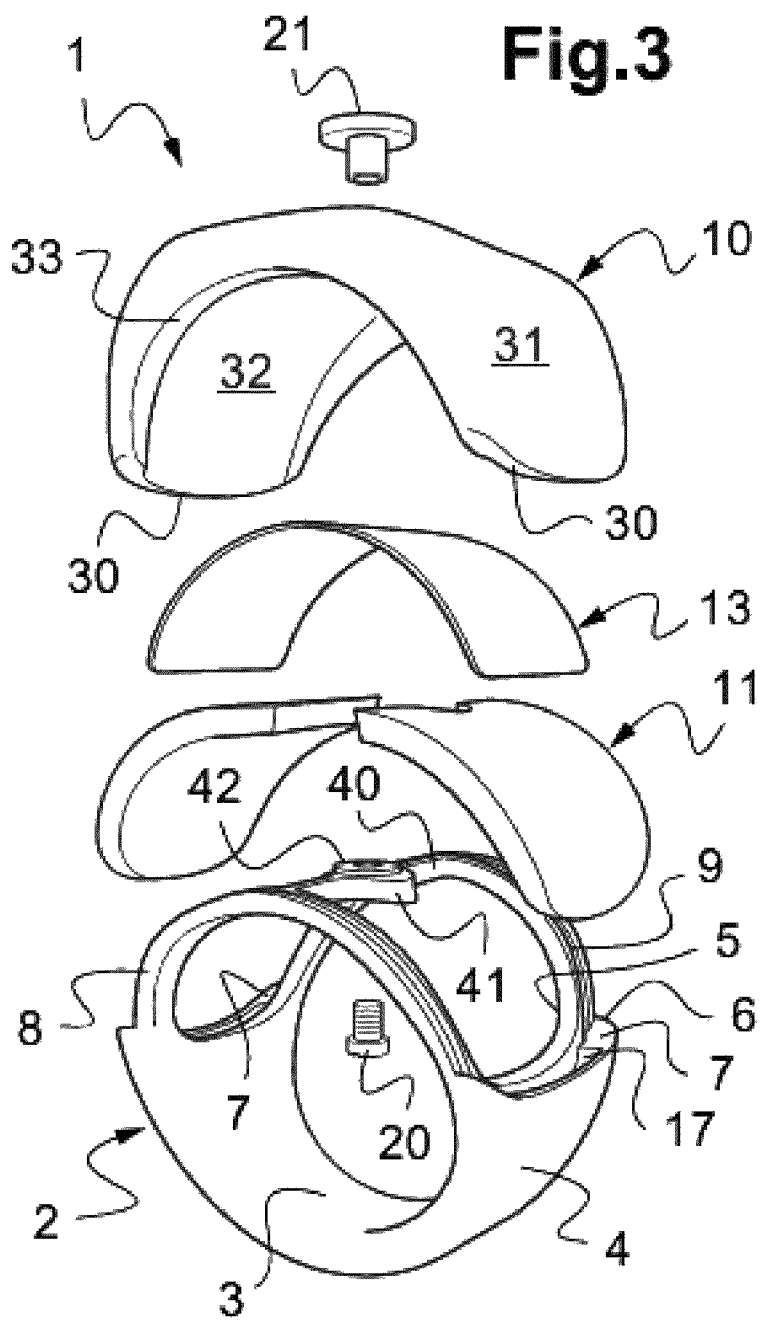
FIG. 3 is an exploded perspective view of an item of jewelry according to an aspect of the invention.

Thus, the item of jewelry 1 has an annular general shape. It may consist of a ring. The item of jewelry 1 comprises a ring body 2. The ring body 2 is structural meaning that it confers on the item of jewelry 1 its general shape. The ring body 2 has a bore 3 or inner surface, an outer surface 4 and an opening 5 passing through the ring body 2 from the bore 3 to the outer surface 4. The edges 6 of the ring body 2 have a free annular shape. In this case, the edges 6 of the ring body 2 are rounded. In other words, the ring body 2 has a common branch and two branches 8, 9 spaced axially according to the axis of the ring, the two distant branches joining the common branch at each of their ends, cf. FIG. 3.

In the illustrated embodiment, the ring body 2 is annular and made in one-piece. The ring body 2 is symmetrical with respect to a plane normal to the axis of the bore 3. The ring body 2 has a first solid portion, in the bottom part of the figures, and a second portion, in the top part of the figures. The first portion has a thickness in the radial direction variable with a minimum at a distance from the second portion. The second portion comprises the two axially spaced branches 8, 9 delimiting the opening 5. Each branch 8, 9 is arcuate. In cross-section, the branch 8, 9 has a rounded section towards the edge 6 and towards the bore 3. Opposite the bore 3, the section of the branch 8, 9 is, herein, straight, in particular parallel to the axis of the bore 3. Towards the opening 5, the section of the branch 8, 9 is straight, for example oriented radially. At least one indentation may be provided to facilitate the positioning and holding of other elements hereinbelow. The indentation is formed on the edge of the opening opposite the bore 3 and the edge 6, continuously or discontinuously, for example, on the branches 8, 9.

The branches 8, 9 have a thickness smaller than the thickness of the first portion, at least in the vicinity of said first portion. Thus, a substantially radial surface 7 is formed between the first portion and the second portion on each side of the ring body 2. A concavity 17 may be formed in said substantially radial surface 7. The concavity 17 conforms to the shape of the ring body 2. The concavity 17 is blind.

The ring body 2 may be made of a material forming an obstacle to the transmission of radio waves. The ring body 2 is made of a material selected from among: gold, silver, platinum, palladium, vermeil, titanium, steel.

The item of jewelry 1 comprises an outer shell 10 forming part of the outer surface 4 of the item of jewelry 1 and in contact with the ring body 2. The item of jewelry 1 comprises an inner shell 11 forming part of the surface of said bore 3 and in contact with the ring body 2. A housing 12 closed in the mounted state is formed between the outer shell 10 and the inner shell 11 substantially in line with or in the opening 5. The housing 12 is semi-circular. The item of jewelry 1 comprises a flexible tag 13 arranged in the housing 12. The tag 13 comprises an electronic chip 14 and an antenna 15 arranged around the electronic chip 14.

The item of jewelry 1 comprises a screw 20 holding the outer shell 10 and the inner shell 11 together. In the illustrated embodiment, a nut 21 is provided forming a bolt with the screw 20. The screw 20 has a head with a small thickness. The screw 20 is fitted from the inside of the ring body 2. the nut 21 is fitted from the outside. The screw 20 engages with the nut 21. The screw and the nut may be made of the same material as the ring body 2 or selected from the same group of materials. The nut may also comprise a precious, fine or ornamental gem.

The outer shell 10 is made in one-piece. The outer shell 10 covers the opening 5 on the external side, in other words opposite the bore 3. The outer shell 10 may also partially cover the branches 8, 9. The outer shell 10 is arcuate. The outer shell 10 has a thickness comprised between 1.0 and 3.0 mm.

The circumferential free ends 30 of the outer shell 10 come into contact with the substantially radial surfaces 7. The circumferential free ends 30 of the outer shell 10 may be provided with protuberances to project into the concavities 17. The outer shell 10 has a free outer surface 31 for artistic design or to support another member. The outer shell 10 has an inner surface 32 delimiting the housing 12. The inner surface may be formed recessed with respect to a cylinder forming a geometric envelope of the outer shell 10 to increase the volume of the housing 12. Two ribs 33 may be formed at the boundary of said recess. The ribs may be in contact with said indentation of the branches 8, 9.

Figure 6:
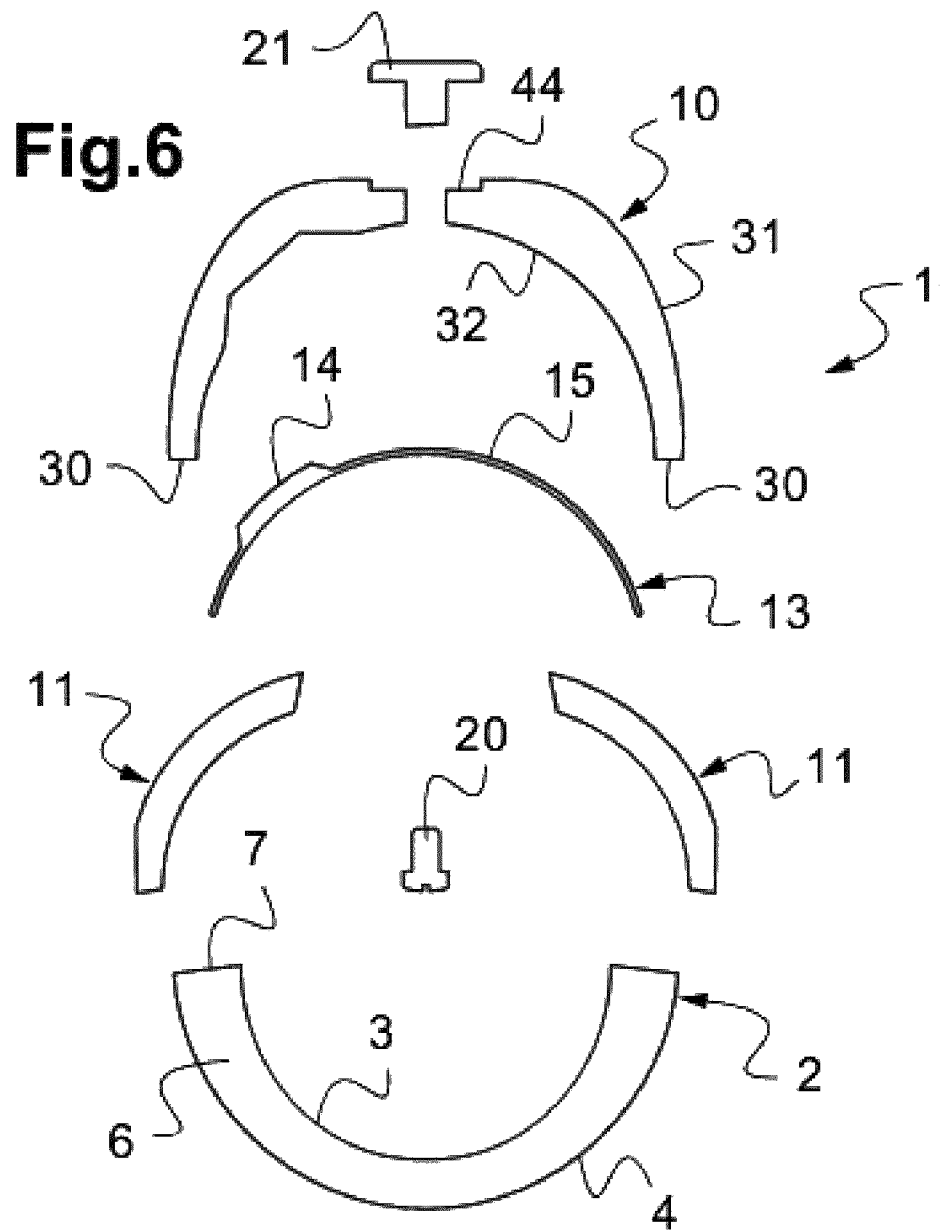
FIG. 6 is an exploded cross-sectional view of an item of jewelry according to a sectional plane normal to the axis.

A through-hole 34, cf. FIG. 6, is formed in the outer shell 10. Alternatively, the hole is blind and threaded opening onto the inner surface 32 for engagement with the screw 10. The hole 34 is radial. The hole 34 is arranged at the centre of the outer shell 10. On the outside, the hole 34 may have a counterbore 44.

The outer shell 10 is made of a material selected from among: gems, precious fine gems, ornamental gems, leather.

The inner shell 11 is herein made in two portions, each one being made in one-piece. The two portions are symmetrical with respect to a plane passing through the axis in the e illustrated embodiment. Alternatively, the inner shell 11 is made in one-piece. The inner shell 11 covers the opening 5 on the inner side, in other words on the side of the bore 3. The inner shell 11 is inserted between the branches 8, 9. The inner shell 11 has a thickness comprised between 1.0 and 2.0 mm.

The inner shell 11 is arcuate. The circumferential free ends 30 of the inner shell 11 come into contact with the edge of the opening 5. The inner shell 11 has an outer surface 35 delimiting the housing 12. The outer surface 35 may be substantially smooth. The outer surface 35 may be straight in section according to a plane passing through the axis. The outer surface 35 is distant from the inner surface 32 at least in part. The inner shell 11 has an inner surface 36 flush with the bore 3 of the ring body 2. The inner shell 11 has edges in contact with the inner edges of the opening 5. The inner shell 11 is longer, according to the longitudinal axis, than the aperture of the opening 5 and occupies a larger angular sector. Thus, the inner shell 11 rests in the mounted state, on the edge of the opening 5, in particular most of the edge, preferably over the entire edge except, where appropriate, at some points. Mounting of the inner shell 11 on the ring body 2 is performed from the outside, in particular according to a radial translation.

Figure 4:
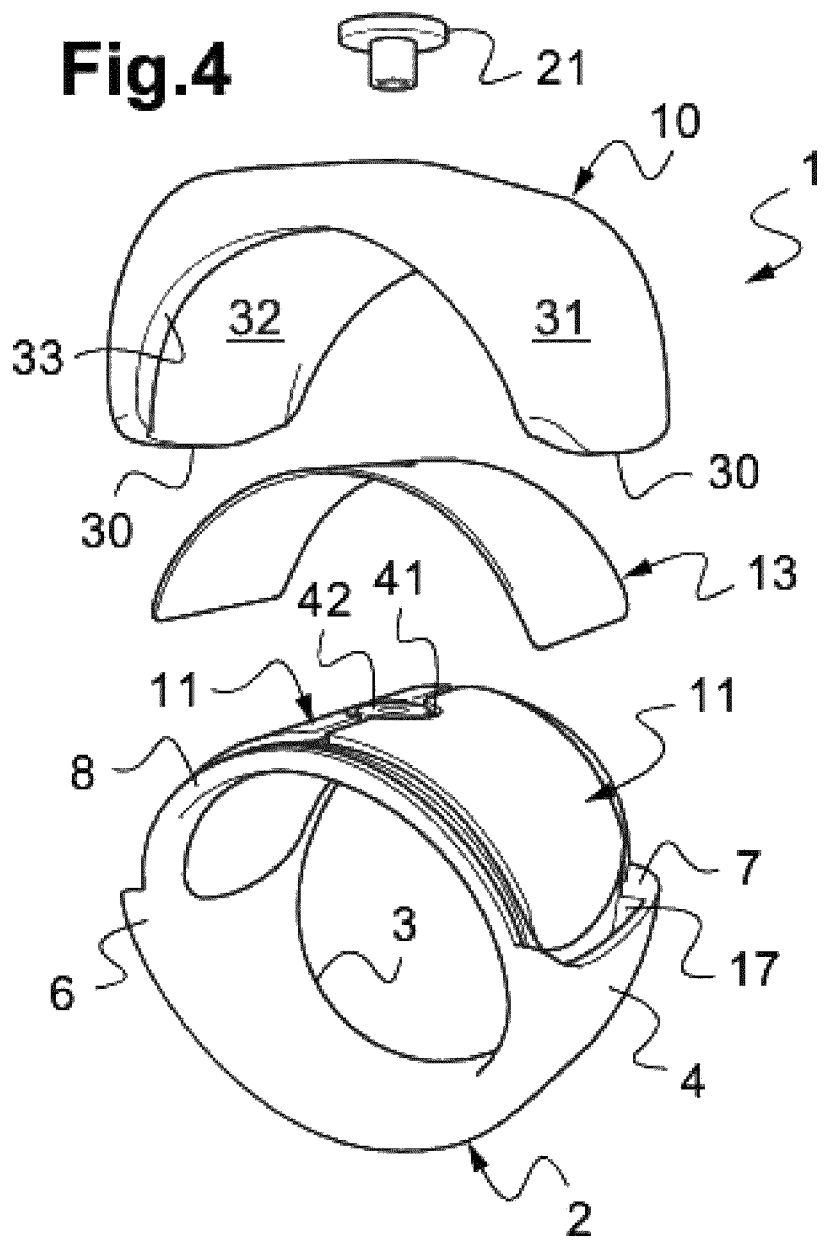
FIG. 4 is a perspective view of the item of jewelry of FIG. 3 during mounting.
Figure 5:
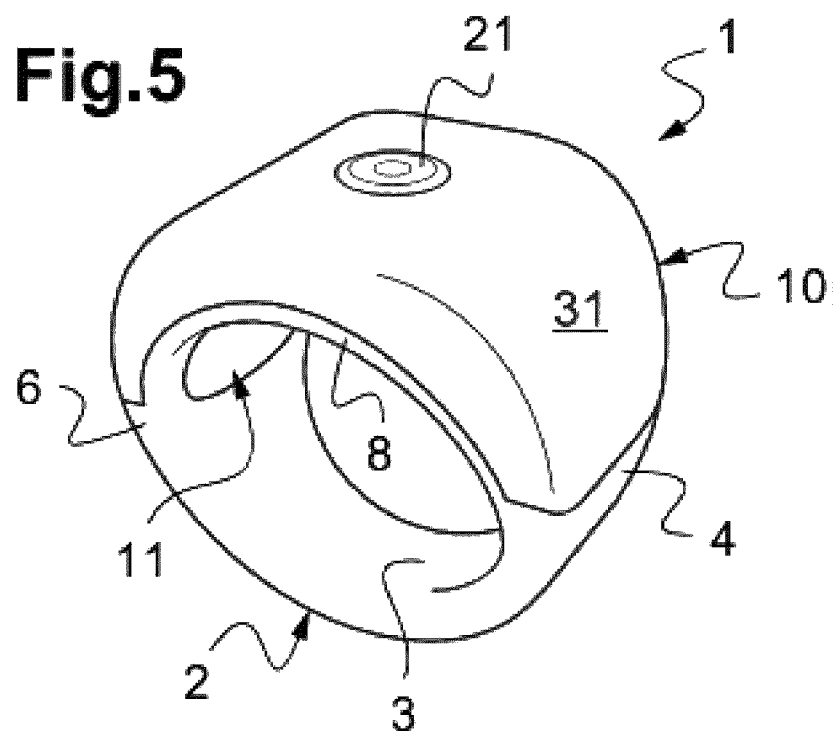
FIG. 5 is a perspective view of the item of jewelry of FIG. 3 when mounted.
Figure 7:
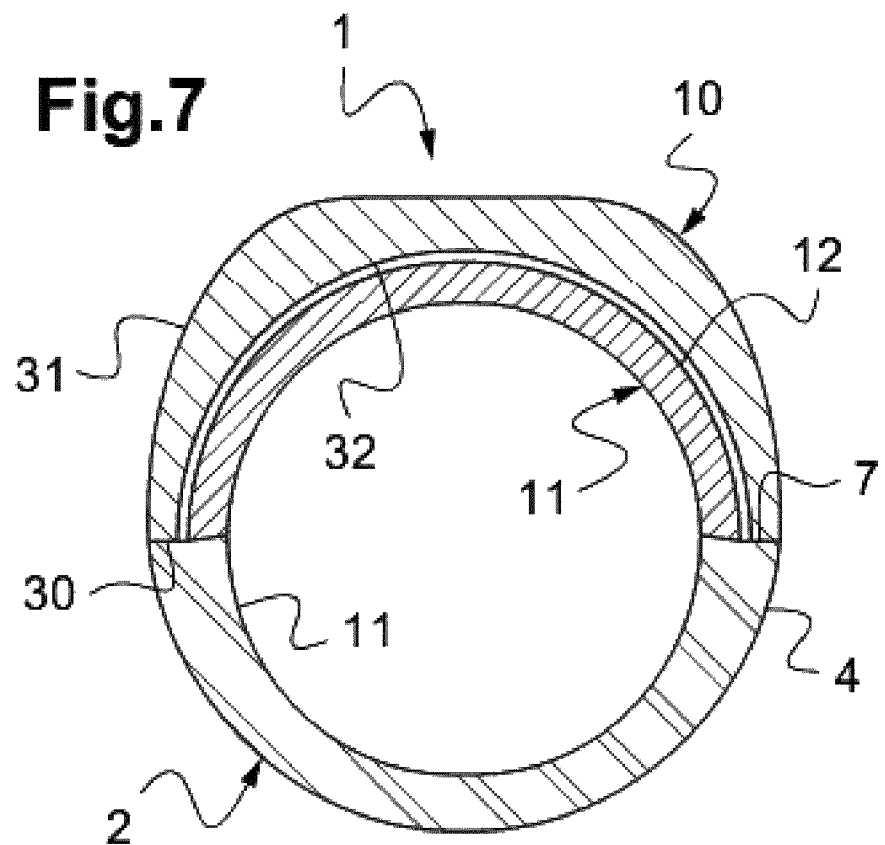
FIG. 7 is a sectional view of an item of jewelry according to the same sectional plane as [FIG. 6].
Figure 8:
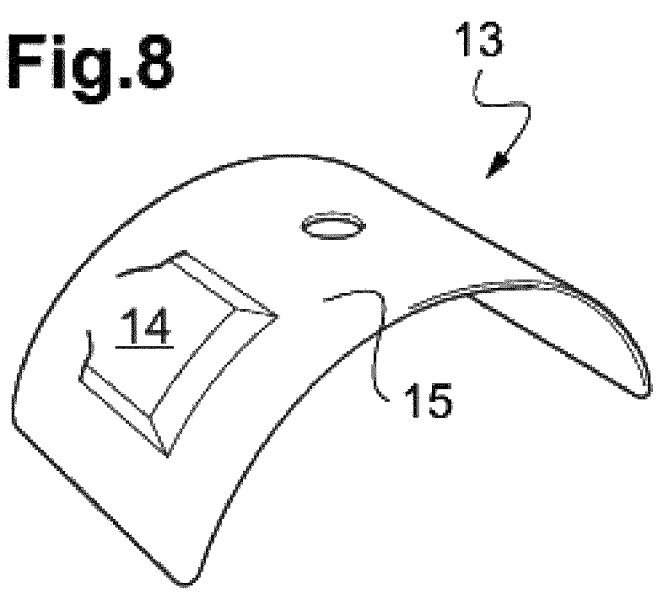
FIG. 8 is a perspective view of the flexible tag according to an aspect of the invention.
Figure 9:
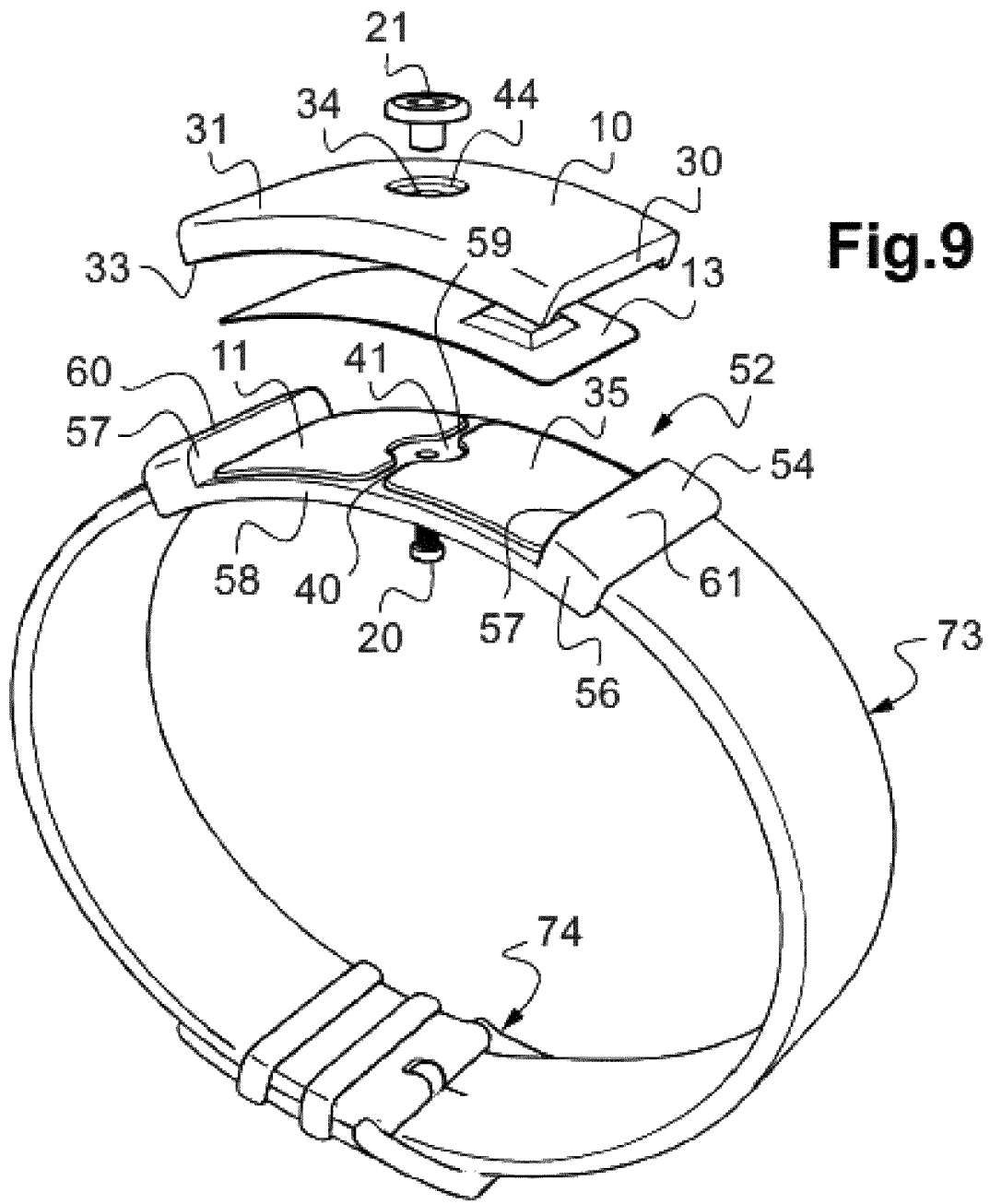
FIG. 9 is an exploded perspective view of an item of jewelry according to another aspect of the invention.
Figure 10:
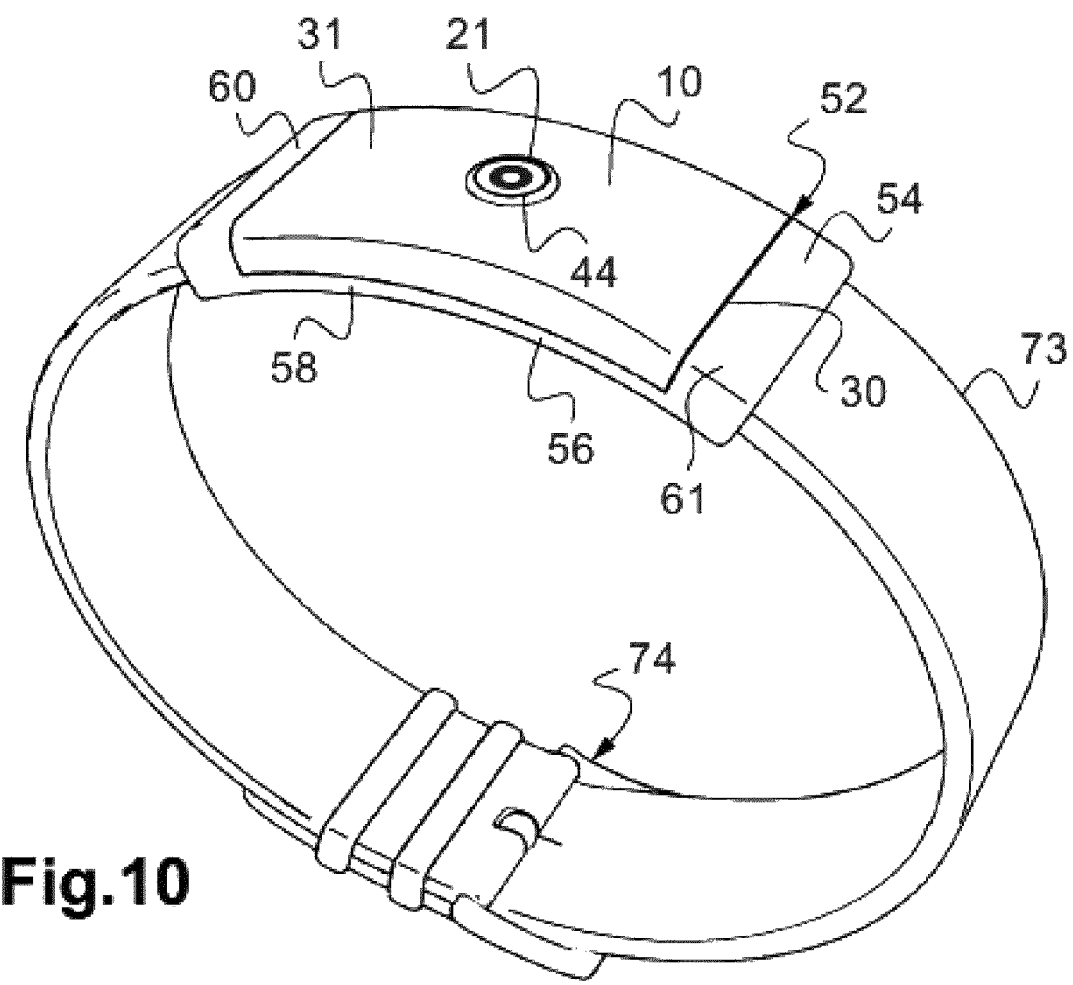
FIG. 10 is a perspective view of the item of jewelry of FIG. 9 when mounted.
Figure 11:
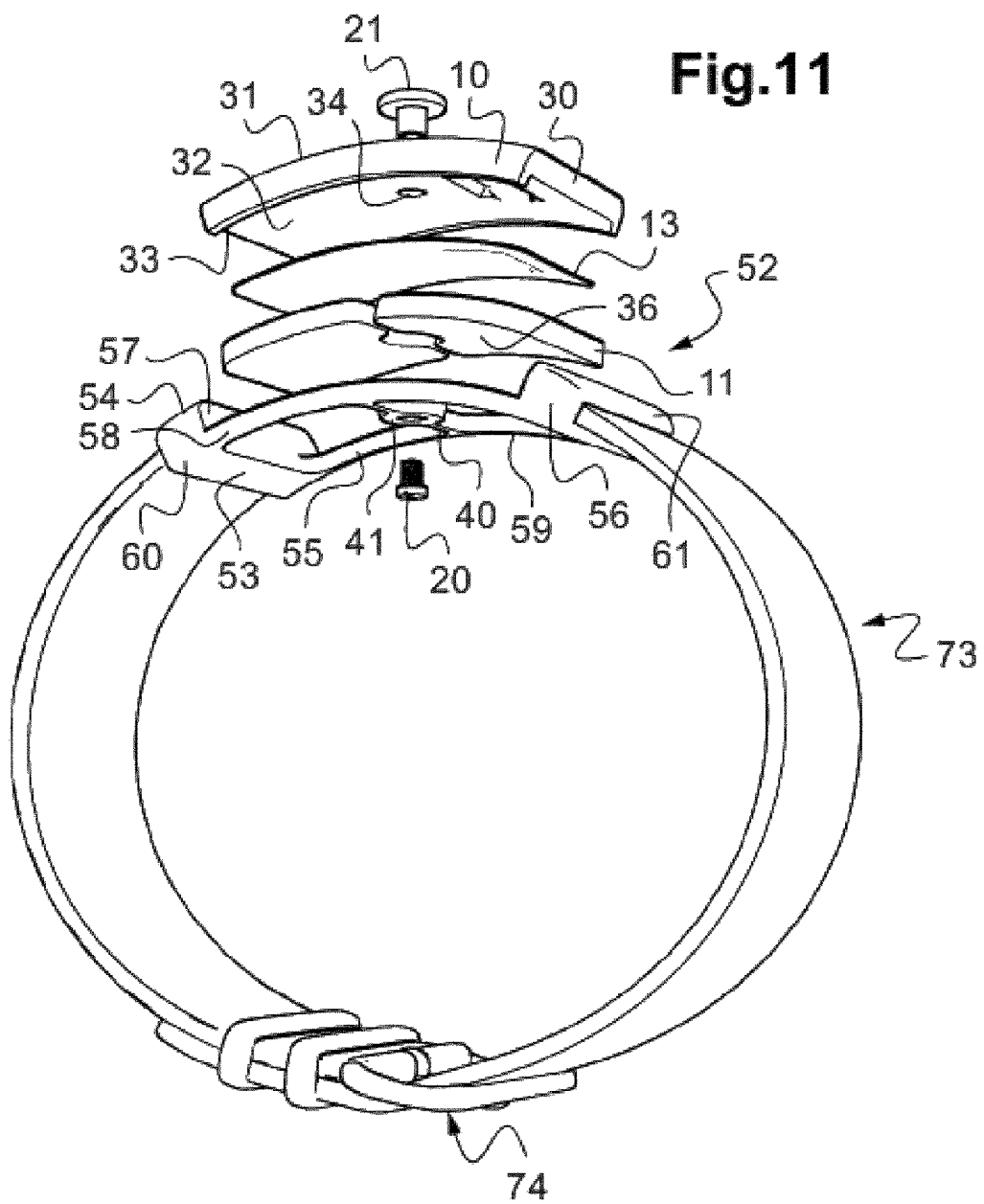
FIG. 11 is an exploded perspective view of the item of jewelry of FIG. 9.

Once mounted on the ring body 2, the outer surface 35 is flush with the concavities 17, cf. FIG. 4. the inner surface 32 is flush with the bore 3, cf. FIG. 7. The branches 8, 9 protrude axially from the inner shell 11, cf. FIGS. 4 and 5.

The inner shell 11 is made of a material selected from among: precious gems, fine gems, ornamental gems, leather.

Figure 1:
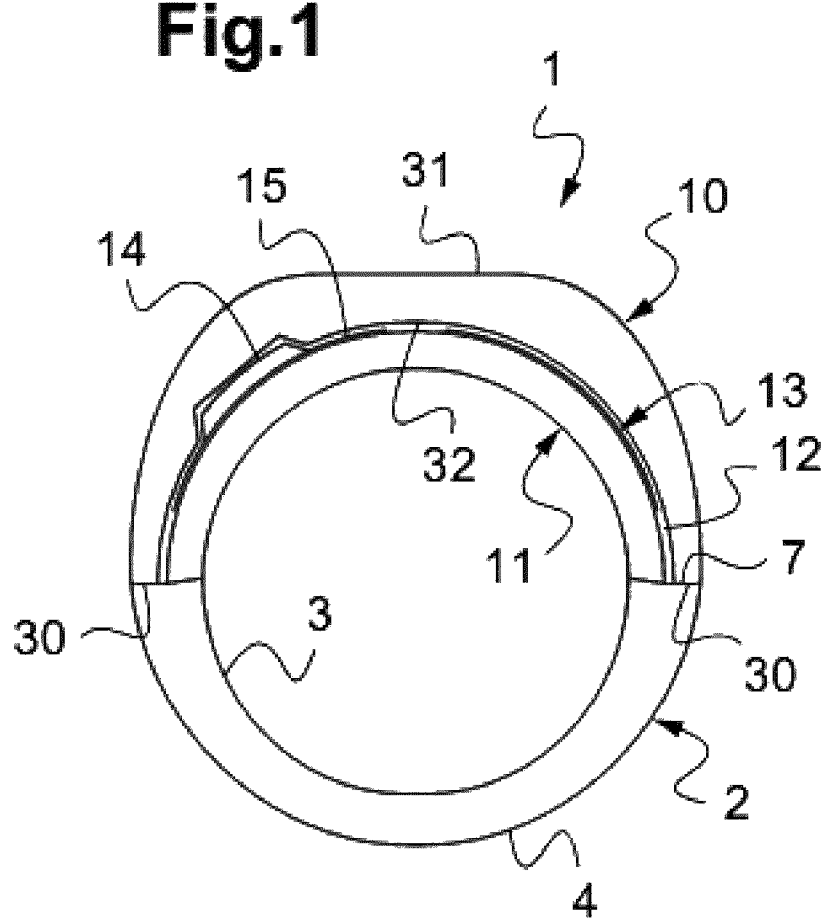
FIG. 1 is a cross-sectional view of an item of jewelry according to an aspect of the invention.
Figure 2:
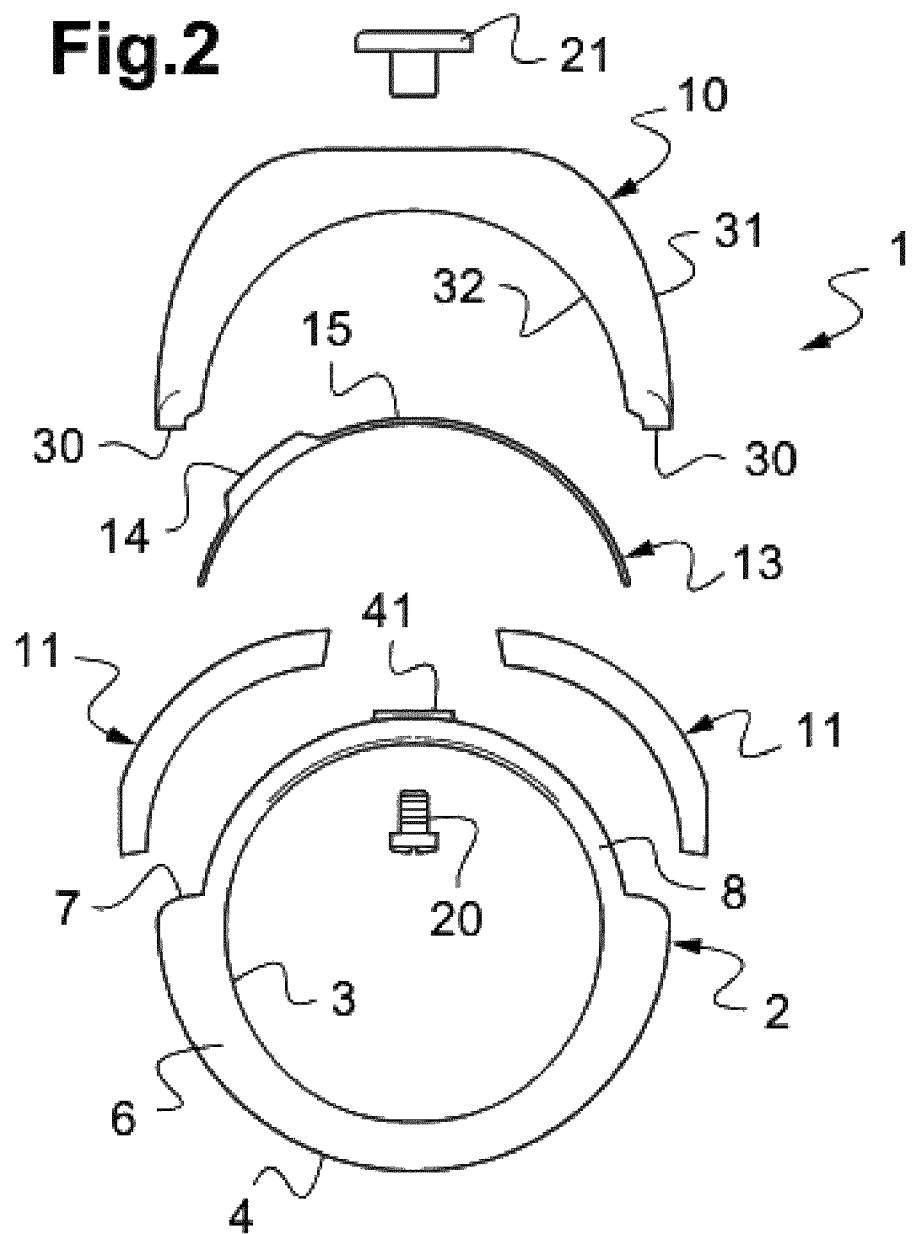
FIG. 2 is an exploded front view of an item of jewelry according to an aspect of the invention.

In the illustrated embodiment, the ring body 2 comprises a spacer 40. The spacer 40 is oriented longitudinally. The spacer 40 is parallel to the axis. The spacer 40 connects the branch 8 and the branch 9. The spacer 40 is mounted substantially at the middle of the opening 5. The spacer 40 is arranged at the top of the ring body 2. the spacer 40 is flush with the bore 3, cf. FIG. 2. The spacer 40 has a rectangular section with a bulge 41 at the middle of said spacer 40. The bulge 41 is crossed by a hole 42. The screw 20 is inserted into the hole 42, cf. FIG. 2, for fastening the members of the item of jewelry 1. The bulge 41 extends widthwise with respect to the spacer 40, namely in the circumferential direction with respect to the ring body 2. The bulge 41 is flush with the bore 3, cf. FIG. 2. The bulge 41 is slightly projecting radially with respect to the branches 8, 9, cf. FIG. 2 and slightly recessed radially with respect to the outer surface 35 of the inner shell 11.

In another embodiment, the ring body 2 is devoid of any spacer. The inner shell is made in one-piece. The screw then clamps the outer shell and the inner shell, the inner shell being mounted from the inside. The screw may also engage in the ring body, for example in one of the branches 8, 9 or in the two branches 8, 9.

When flat, the tag 13 has a rectangular shape with rounded corners. The electronic chip 14 forms a projection with respect to the rest of the tag 13. The inner surface 32 of the outer shell 10 has a corresponding recess at a distance from the free ends 30 and the ribs 33. The electronic chip 14 is offset with respect to the entire tag 13. At the centre of the tag 13, a through-hole is formed for the screw 20. The antenna 15 is wound flat around the electronic chip 14 and around the hole. The tag has a body made of a material that is flexible enough to adapt to the curvature of the housing 12.

Mounting of the tag 13 is performed after mounting the inner shell 11. Afterwards, the outer shell 10 is mounted to enclose the tag 13 in the housing 12. Mounting is performed at room temperature. Before mounting, the ring body may undergo steps carried out at high temperature, for example by welding.

The screw 20 passes between the two portions of the inner shell 11. The screw 20 passes through the bulge 41, the tag 13 and the outer shell 10. The screw 20, where appropriate with the nut 21, holds and clasps the outer shell 10 against the ring body 2. The tolerances are selected so that the inner shell 11 is also firmly held. The tag 13 is protected.

The outer 10 and inner 11 shells confer its arcuate shape on the tag 13. Preferably, the outer shell 10 is opaque. The outer shell 10 consists of a precious, fine or ornamental gem. Said gem is selected from among: diamond, rubis, sapphire, beryl (in particular emerald, aquamarine, heliodor or morganite), tourmaline (in particular verdelite, rubellite, paraiba tourmaline, indicolite or schorl), topaz (in particular sky-blue topaz, Swiss-blue topaz or London-blue topaz), garnet (in particular demantoid garnet, almandine garnet, tsavorite garnet, spessartite garnet, hessonite garnet, rhodolite garnet or pyrope garnet), quartz (in particular cat-eye quartz, falcon-eye quartz, tiger-eye quartz, bull-eye quartz, aventurine, amethyst, citrine, prasiolite, pink quartz, blue quartz, red quartz or smoky quartz), chalcedony (in particular agate, chrysoprase, carnelian, onyx, sardis stone or pietersite), jasper (in particular red jasper, blood jasper, heliotropic jasper), feldspars (in particular amazonite, moon stone, labradorite or sunstone), opal (in particular fire opal, cacholong or noble opal), jade (in particular jade, jadeite, nephrite jade or charoite), peridot, tanzanite, iolite, zircon, cyanite, spinel, rock crystal, kunzite, sodalite, azurite, turquoise, rhodonite, rhodochrosite, malachite, chrysocolla, sugilite, chrysoberyl, andalusite, diopside, pinolite, lapis lazuli, nacre, coral, amber, silicified wood.

The outer shell 10 may also be made of leather.

Once mounted, the item of jewelry 1 is composed of the ring body 2 made of a noble material capable of attenuating or forming a shield for the transmission of waves towards the antenna 15 or from the antenna 15 towards the external environment, inner 11 and outer 10 shells made of one or more material(s) letting the waves pass at the usual frequency ranges, in particular for RFID or NFC. Tag 13 is operational.

In the embodiment of FIGS. 9 to 14, the item of jewelry 1 has a closed ring like general shape. It may consist of a bracelet. The item of jewelry 1 comprises a dial 52 or body and a bracelet body 73. The bracelet body 73 may be flexible, for example made of leather, of plant material, of fabric; or articulated and rigid, for example made of a metal selected from among: gold, silver, platinum, titanium, palladium, vermeil or steel; or of a semi-rigid material, in particular metal. The bracelet body 73 is, herein, equipped with a clasp 74, for example with a buckle and a tongue.

The dial 52 has an arcuate shape. The dial 52 has an inner surface 53, an outer surface 54 and an opening 55 passing through the dial 52 from the inner surface 53 to the outer surface 54. Edges 56 of dial 52 have a free shape. In this case, the edges 56 of the dial 52 are rounded. The dial 52 has, in projection, a rectangular shape with two branches 58, 59 axially apart according to the axis of the item of jewelry 1, the two branches 58, 59 being connected to each other. The two branches 58, 59 are longitudinal. The two branches 58, 59 are connected by transverse branches 60, 61. The transverse branches 60, 61 are, herein, straight. The transverse branches 60, 61 are profiled. The transverse branches 60, 61 connect the ends of the branches 58, 59.

The dial 52 is herein symmetrical with respect to a plane normal to the axis of the item of jewelry 1. The two axially spaced branches 58, 59 delimit the opening 55. Each branch 58, 59 is arcuate. In cross-section, the branch 58, 59 has a rounded section towards the edge 56 and towards the inner surface 53. Opposite the inner surface 53, the section of the branch 58, 59 is, herein, straight, in particular parallel to the axis of the inner surface 53. Towards the opening 55, the section of the branch 58, 59 is straight, for example oriented radially. An indentation may be provided to facilitate the positioning and holding of other members hereinbelow. The indentation is formed over the edge of the opening 55 opposite the inner surface 53 and the edge 56, continuously or discontinuously, for example, on the branches 58, 59.

The branches 58, 59 have a substantially constant thickness. The branches 58, 59 form a first dial portion 52 and are connected by a second dial portion 52. The second dial portion 52 comprises two crosspieces symmetrical with respect to a midplane. Thus, a substantially radial surface 57 is formed between the first portion and the second portion on each side of the dial 52.

The dial 52 may be made of a material forming an obstacle to the transmission of radio waves. The dial 52 is made of a material selected from among: gold, silver, platinum, palladium, glass, titanium or steel.

The item of jewelry 1 comprises an outer shell 10 forming part of the outer surface 54 of the item of jewelry 1 and in contact with the dial 52. The item of jewelry 1 comprises an inner shell 11 forming part of the inner surface 53 and in contact with the dial 52. A housing 12 closed in the mounted state is formed between the outer shell 10 and the inner shell 11 substantially in line with or in the opening 55. The housing 12 is semi-circular. The item of jewelry 1 comprises a flexible tag 13 arranged in the housing 12. The tag 13 comprises an electronic chip 14 and an antenna 15 arranged around the electronic chip 14.

The item of jewelry 1 comprises a screw 20 holding the outer shell 10 and the inner shell 11 together. In the illustrated embodiment, a nut 21 is also provided forming a bolt with the screw 20. The screw 20 has a head with a small thickness. The screw 20 is fitted into the ring body 2. the nut 21 is fitted from the outside. The screw 20 engages with the nut 21. The screw and the nut may be made of the same material as the dial 52 or selected from the same group of materials. The nut may also comprise a precious, fine or ornamental gem.

The outer shell 10 is made in one-piece. The outer shell 10 covers the opening 55 on the outer side, in other words opposite the inner surface 53. The outer shell 10 may also partially cover the arms 58, 59. The outer shell 10 is arcuate. The outer shell 10 has a thickness comprised between 1.0 and 3.0 mm.

The circumferential free ends 30 of the outer shell 10 come into contact with the substantially radial surfaces 57. The circumferential free ends 30 of the outer shell 10 may be provided with straight edges to cooperate with the indentation. The outer shell 10 has a free outer surface 31 for an artistic design or to support another member. The outer shell 10 has an inner surface 32 delimiting the housing 12. The inner surface may be formed recessed with respect to a cylinder forming a geometric envelope of the outer shell 10 to increase the volume of the housing 12. Two ribs 33 may be formed at the boundary of said hollow. The ribs may be in contact with said indentation of the branches 58, 59.

A through-hole 34, cf. FIG. 6, is formed in the outer shell 10. Alternatively, the hole is blind and threaded opening onto the inner surface 32 for engagement with the screw 20. The hole 34 is radial. The hole 34 is arranged at the centre of the outer shell 10. On the outside, the hole 34 may have a counterbore 44.

The outer shell 10 is made of a material selected from precious among: gems, fine gems, ornamental gems, leather.

The inner shell 11 is herein made in two portions, each one being made in one-piece. The two portions are symmetrical with respect to a plane passing through the axis in the illustrated embodiment. Alternatively, the inner shell 11 is made in one-piece.

The inner shell 11 covers the opening 5 on the inner side, in other words on the inner surface 53. The inner shell 11 is inserted between the branches 58, 59. The inner shell 11 has a thickness comprised between 1.0 and 2.0 mm.

The inner shell 11 is arcuate. The circumferential free ends 30 of the inner shell 11 come into contact with the edge of the opening 55. The inner shell 11 has an outer surface 35 delimiting the housing 12. The outer surface 35 may be substantially smooth. The outer surface 35 may be straight in section according to a plane passing through the axis. The outer surface 35 is distant from the inner surface 32 at least in part. The inner shell 11 has an inner surface 36 flush with the inner surface 53 of the dial 52. The inner shell 11 has edges in contact with the inner edges of the opening 55. The inner shell 11 is longer, according to the longitudinal axis, than the aperture of the opening 55 and occupies a larger angular sector. Thus, the inner shell 11 rests in the mounted state, on the edge of the opening 55, in particular over most of the edge, preferably over the entire edge except, where appropriate, in a punctual manner. The inner shell 11 is mounted on the dial 52 from the outside, in particular according to a radial translation.

Figure 12:
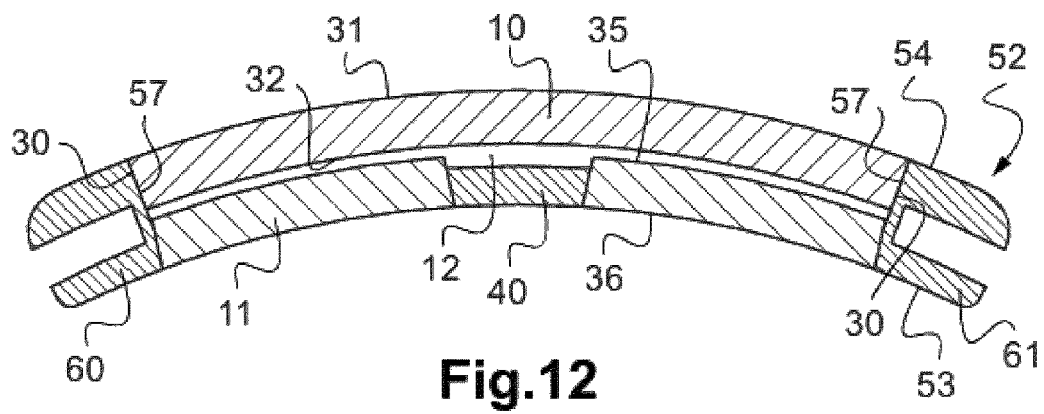
FIG. 12 is a sectional view of the item of jewelry of FIG. 9 when mounted.
Figure 13:
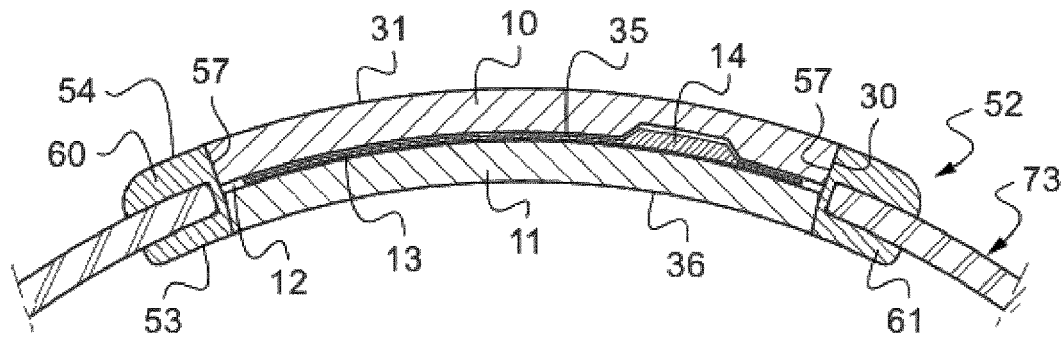
FIG. 13 is a sectional view of the item of jewelry of FIG. 9 when mounted.
Figure 14:
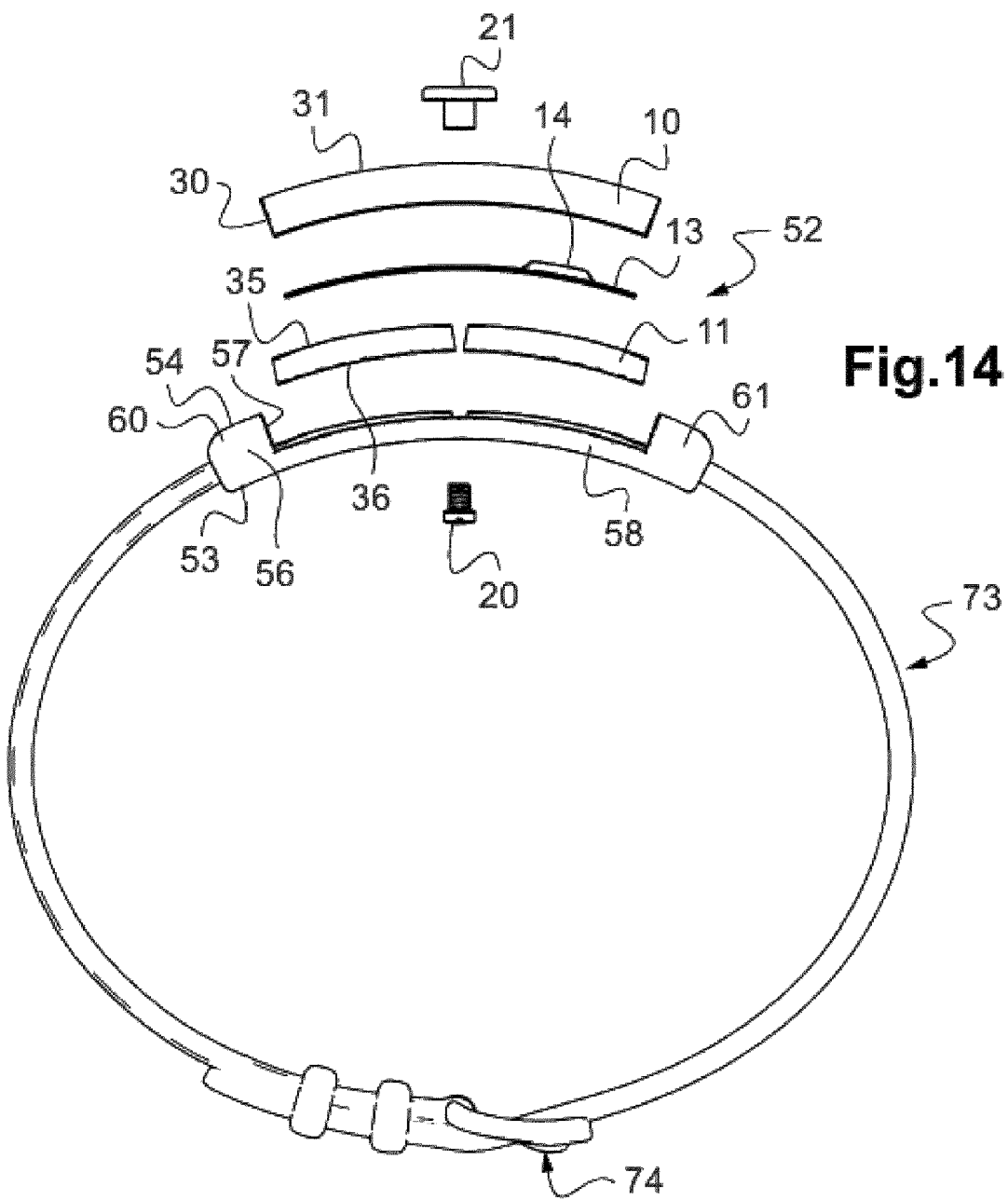
FIG. 14 is an exploded front view of the item of jewelry of FIG. 9.
Figure 15:
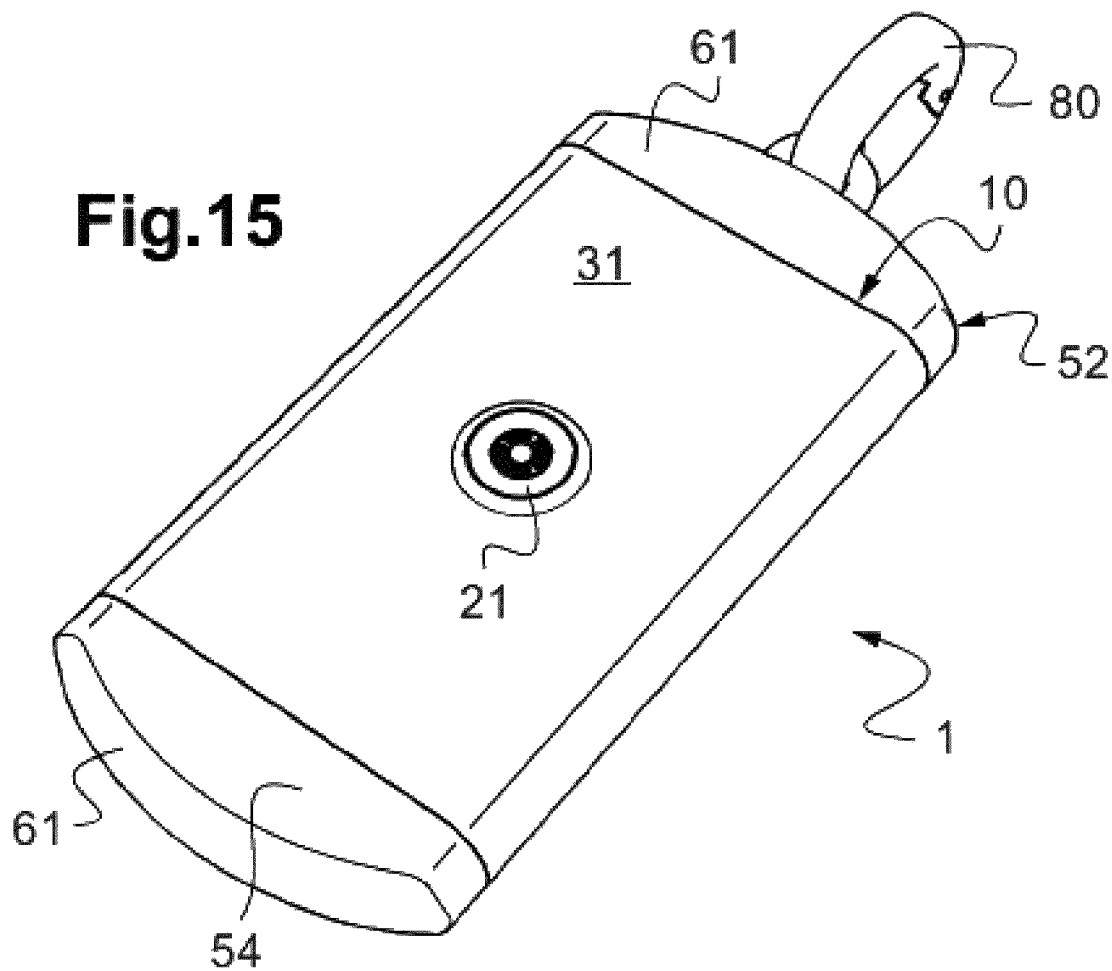
FIG. 15 is a perspective view of an item of jewelry according to another aspect of the invention when mounted.
Figure 16:
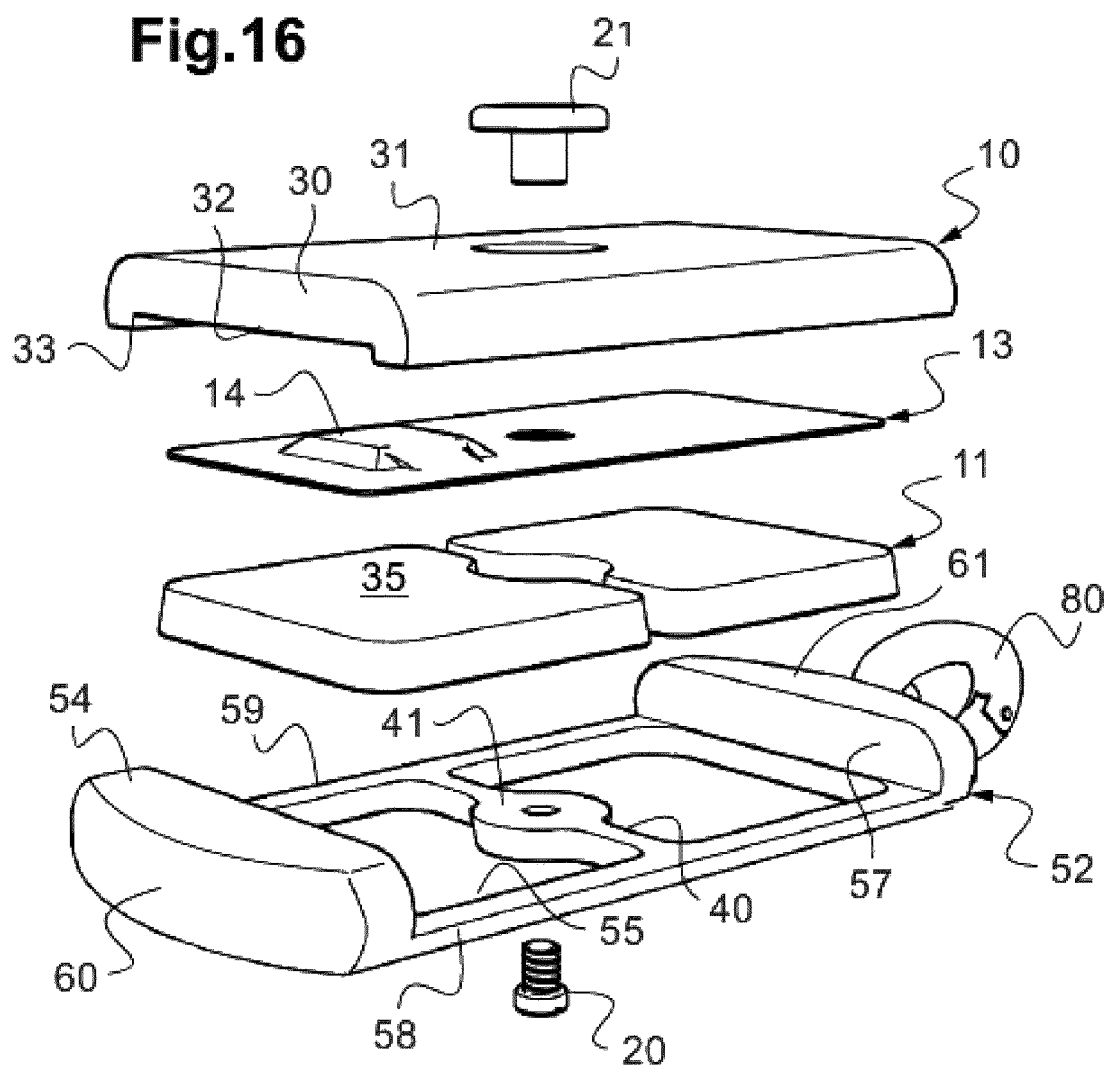
FIG. 16 is an exploded perspective view of the item of jewelry of FIG. 15.
Figure 17:
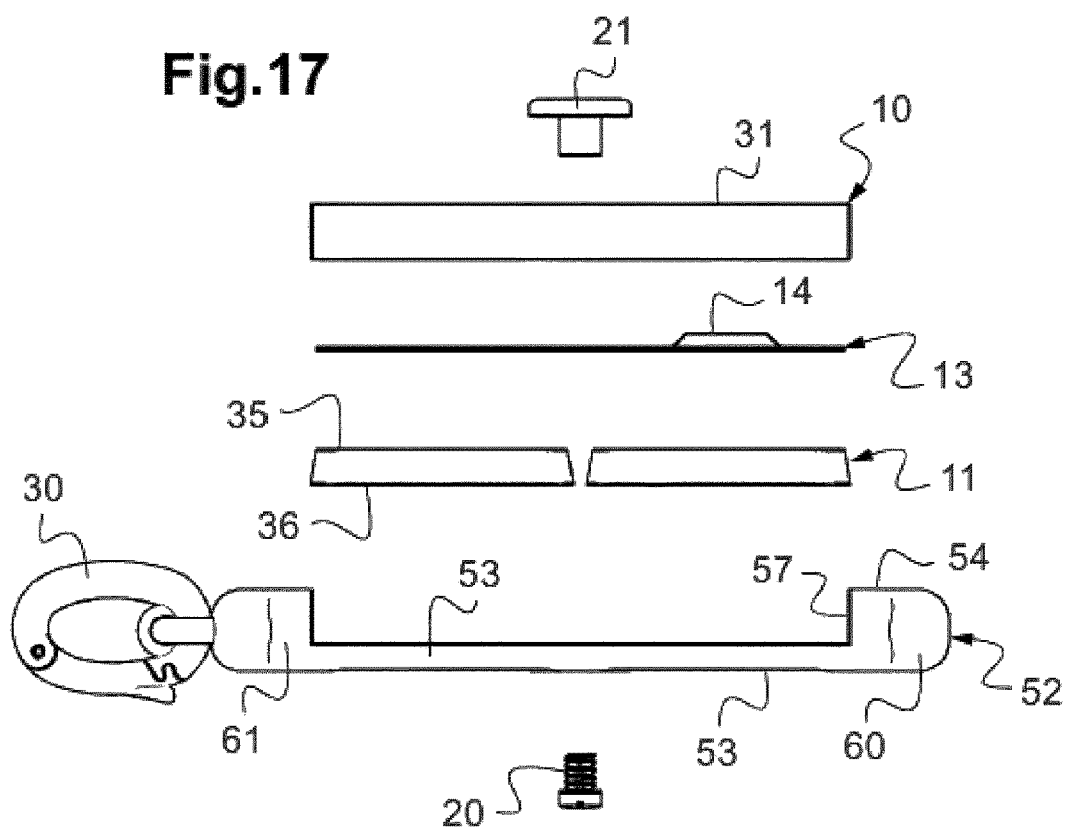
FIG. 17 is an exploded perspective view of the item of jewelry of FIG. 15.
Figure 18:
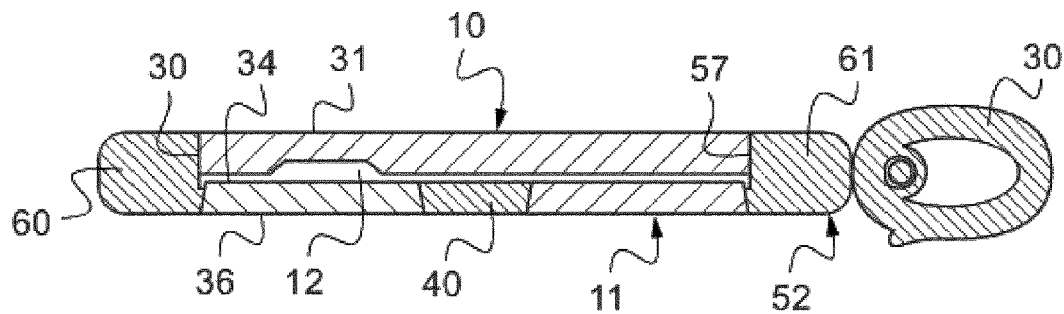
FIG. 18 is a sectional view of the item of jewelry of FIG. 15 when mounted.
Figure 19:
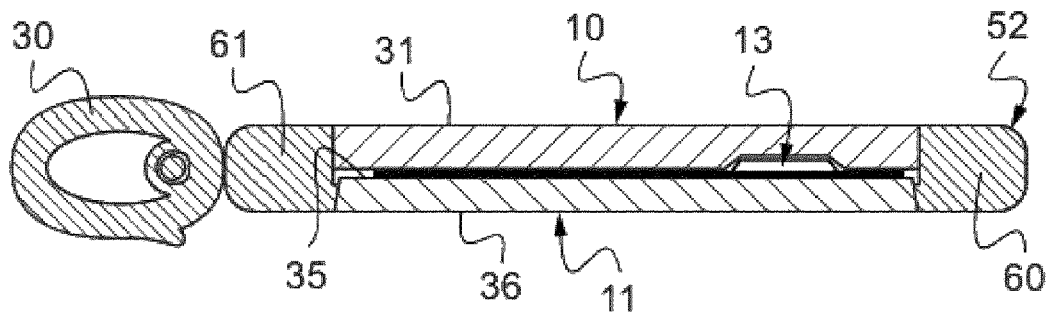
FIG. 19 is a sectional view of the item of jewelry of FIG. 15 when mounted.

Once mounted on the dial 52, the outer surface 35 is flush with the indentation, cf. FIG. 12. The inner surface 32 is flush with the inner surface 53, cf. FIGS. 12 & 13. The branches 58, 59 protrude axially from the inner shell 11, cf. FIGS. 9 and 10.

The inner shell 11 is made of a material selected from among: precious gems, fine gems, ornamental gems, leather.

In the illustrated embodiment, the dial 52 comprises a spacer 40. The spacer 40 is oriented longitudinally. The spacer 40 is parallel to the axis. The spacer 40 connects the branch 58 and the branch 59. The spacer 40 is mounted substantially at the middle of the opening 55. The spacer 40 is arranged at the top of the dial 52. The spacer 40 is flush with the inner surface 53, cf. FIG. 12. The spacer 40 has a rectangular section with a bulge 41 at the middle of said spacer 40. The bulge 41 is crossed by a hole 42. The screw 20 is inserted into the hole 42, cf. FIGS. 10 and 11, for fastening the members of the item of jewelry 1. The bulge 41 extends widthwise with respect to the spacer 40, namely in the circumferential direction with respect to the dial 52. The bulge 41 is flush with the inner surface 53, cf. FIG. 11. The bulge 41 is flush with an outer surface of the branches 58, 59, cf. FIG. 10.

The tag 13 is similar to the tag of the preceding embodiment with less curvature. The tag 13 has a body made of a material that is flexible enough to adapt to the curvature of the housing 12.

Mounting of the tag 13 is performed after mounting the inner shell 11. Afterwards, the outer shell 10 is mounted so as to enclose the tag 13 in the housing 12. Mounting is performed at room temperature. Before mounting, the dial may undergo steps carried out at high temperature, for example by welding.

The screw 20 passes between the two portions of the inner shell 11. The screw 20 passes through the bulge 41, the tag 13 and the outer shell 10. The screw 20, where appropriate with the nut 21, holds and clasps the outer shell 10 against the dial 52. The tolerances are selected so that the inner shell 11 is also firmly held. The tag 13 is protected. The screw and the nut may be made of the same material as the ring body 2 or selected from the same group of materials. The nut may also comprise a gem.

The outer 10 and inner 11 shells confer its rounded shape on the tag 13.

Preferably, the outer shell 10 is opaque.

Once mounted, the item of jewelry 1 is composed of the dial 52 made of a noble material capable of attenuating or forming a shield for the transmission of waves towards the antenna 15 or from the antenna 15 towards the external environment, inner 11 and outer 10 shells made of one or more material(s) letting the waves pass in the usual frequency ranges, in particular for RFID or NFC. Tag 13 is operational.

In the embodiment of FIGS. 15 to 20, the item of jewelry 1 has a flat general shape. It may consist of a pendant. The item of jewelry 1 has a structure similar to that of the preceding embodiment. The body 52 is flat. A ring 80 is attached at one end of dial 52

The inner surface 53 and outer surface 54 are parallel. The housing 12 is in the form of a rectangular parallelepiped with a small thickness. The tag 13 is flat.

The invention claimed is:

1. An item of jewelry comprising a body having an inner surface, an outer surface and an opening passing through the body from the inner surface to the outer surface, the body being made of a material selected from among: gold, silver, platinum, titanium, palladium, steel or vermeil; an outer shell forming part of the outer surface of the item of jewelry and in contact with the body, the outer shell being made of a material selected from among: precious gems, fine gems, ornamental gems, leather; an inner shell forming part of the inner surface and in contact with the body, a closed housing being formed between the outer shell and the inner shell substantially in line with or in the opening, the housing being semi-circular, the inner shell being made of a material selected from among: precious gems, fine gems, ornamental gems, leather; a flexible tag arranged in the housing and comprising an electronic chip and an antenna arranged around the electronic chip, and a screw holding the outer shell and the inner shell together.

2. The item of jewelry according to claim 1, wherein the body has two openings, the two openings being formed through the body from the inner surface to the outer surface, the two openings being separated by a crosspiece forming part of the body.

3. The item of jewelry according to claim 2, wherein the screw is engaged in the crosspiece.

4. The item of jewelry according to claim 1, wherein the screw is engaged in the body in the vicinity of an edge of the opening, an additional screw being engaged in the body in the vicinity of an edge of the opening on an opposite side.

5. The item of jewelry according to claim 1, wherein the screw cooperates with a threaded bore formed in the body or with a nut.

6. The item of jewelry according to claim 1, wherein the body is made in one-piece.

7. The item of jewelry according to claim 1, wherein the outer shell has a thickness comprised between 1.0 and 3.0 mm and the inner shell has a thickness comprised between 1.0 and 2.0 mm.

8. The item of jewelry according to claim 1, wherein said precious, fine or ornamental gem is selected from among:
   Diamond, Rubis, Sapphire,
   Beryl, in particular emerald, aquamarine, heliodor, morganite,
   Tourmaline, in particular verdelite, rubellite, Paraiba tourmaline, indicolite, schorl,
   Topaz, in particular sky-blue topaz, Swiss-blue topaz, London-blue topaz,
   Garnet, in particular demantoid garnet, almandine garnet, tsavorite garnet, spessartite garnet, hessonite garnet, rhodolite garnet, pyrope garnet,
   Quartz, in particular cat-eye quartz, falcon-eye quartz, tiger-eye quartz, bull-eye quartz, aventurine, amethyst, citrine, prasiolite, pink quartz, blue quartz, red quartz, smoky quartz,
   Chalcedony in particular agate, chrysoprase, Carnelian, onyx, sardis stone, pietersite,
   Jasper, in particular red jasper, blood jasper, heliotropic jasper,
   Feldspars, in particular amazonite, moon stone, labradorite, sunstone,
   Opal, in particular fire opal, cacholong, noble opal,
   Jade in particular jade, jadeite, nephrite jade, charoite,
   Peridot, tanzanite, iolite, zircon, cyanite, spinel, rock crystal, kunzite, sodalite, azurite, turquoise, rhodonite, rhodochrosite, malachite, chrysocolla, sugilite, chrysoberyl, andalusite, diopside, pinolite, lapis lazuli,
   Nacre, coral, amber, silicified wood.

9. The item of jewelry according to claim 1, wherein the electronic chip forms a protuberance with respect to the antenna and the outer shell has a local concavity corresponding to said protuberance.

10. The item of jewelry according to claim 1, wherein the body has a plane of symmetry passing through an axis of a ring and, has over a portion of the outer surface, an indentation adapted to the outer shell.

11. The item of jewelry according to claim 1, wherein the body is a ring body.

12. The item of jewelry according to claim 1, wherein the item of jewelry is in a form of a bracelet.

13. The item of jewelry according to claim 1, wherein the item of jewelry is in a form of a ring.

14. The item of jewelry according to claim 1, wherein the item of jewelry is in a form of a pendant.

* * * * *